US012449285B2

(12) United States Patent
Sevar

(10) Patent No.: US 12,449,285 B2
(45) Date of Patent: Oct. 21, 2025

(54) SENSOR ASSEMBLY FOR MEASURING THE AVERAGE VELOCITY IN CONDUITS OR OPEN CHANNELS

(71) Applicant: FLOW-TRONIC S.A., Welkenraedt (BE)

(72) Inventor: Jean-Marie Sevar, Welkenraedt (BE)

(73) Assignee: FLOW-TRONIC S.A., Welkenraedt (BE)

( * ) Notice: Subject to any disclaimer, the term of this patent is extended or adjusted under 35 U.S.C. 154(b) by 446 days.

(21) Appl. No.: 18/247,089

(22) PCT Filed: Oct. 12, 2021

(86) PCT No.: PCT/IB2021/000702
§ 371 (c)(1),
(2) Date: Mar. 29, 2023

(87) PCT Pub. No.: WO2022/069946
PCT Pub. Date: Apr. 7, 2022

(65) Prior Publication Data
US 2023/0408310 A1    Dec. 21, 2023

(30) Foreign Application Priority Data
Sep. 29, 2020 (EP) .................................... 20198856

(51) Int. Cl.
*G01F 1/58* (2006.01)
*G01F 1/002* (2022.01)
*G01F 1/56* (2006.01)

(52) U.S. Cl.
CPC .............. *G01F 1/584* (2013.01); *G01F 1/002* (2013.01); *G01F 1/56* (2013.01)

(58) Field of Classification Search
CPC ............. G01F 1/584; G01F 1/002; G01F 1/56
(Continued)

(56) References Cited

U.S. PATENT DOCUMENTS

| 4,688,432 A | 8/1987 | Marsh |
| 8,136,410 B2 | 3/2012 | Hobbs |

(Continued)

FOREIGN PATENT DOCUMENTS

| CA | 1304602 C | 7/1992 |
| DE | 1202515 B | 10/1965 |

(Continued)

OTHER PUBLICATIONS

International Search Report and Written Opinion received for PCT Serial No. PCT/IB2021/000702 on Feb. 11, 2022, 13 pgs.

*Primary Examiner* — Peter J Macchiarolo
*Assistant Examiner* — John M Royston
(74) *Attorney, Agent, or Firm* — Merchant & Gould P.C.

(57) ABSTRACT

A sensor assembly is for measuring average velocity of a fluid flowing in a closed conduit or in an open channel. The sensor assembly is adapted to measure average velocity though closed conduits of different sizes or through open channels with different fluid levels. The sensor assembly includes a housing extending across an inside of the closed conduit or to extend vertically in the section of the open channel. The housing includes pairs of electrodes and at least one associated electromagnet for measuring the velocity distribution in the closed conduit or in the open channel. An isolator allows isolation from the pairs of electrodes or from signals of the pairs of electrodes that are not in contact with the fluid flow to be measured. The isolator is configured to be adapted depending on water level in the open channel or size of the closed conduit.

20 Claims, 7 Drawing Sheets

(58) Field of Classification Search
USPC .................................................. 73/861.12
See application file for complete search history.

(56) References Cited

U.S. PATENT DOCUMENTS

| | | | |
|---|---|---|---|
| 9,052,221 B2 * | 6/2015 | Drahm | G01F 1/586 |
| 9,784,603 B2 * | 10/2017 | Xie | G01F 1/60 |
| 2011/0162459 A1 | 7/2011 | Hobbs | |

FOREIGN PATENT DOCUMENTS

| | | |
|---|---|---|
| DE | 4114537 A1 | 11/1992 |
| DE | 19637716 C1 | 4/1998 |

* cited by examiner

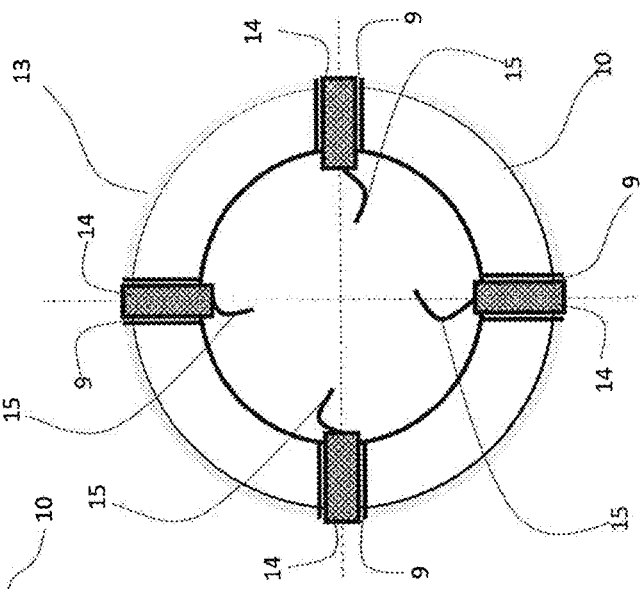
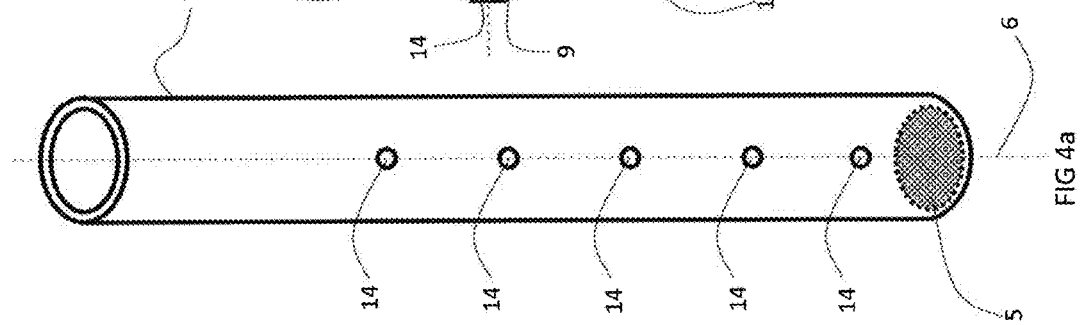
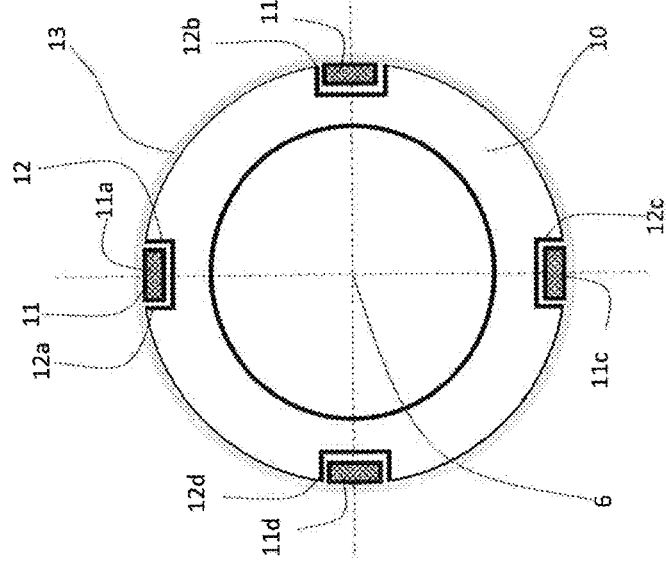
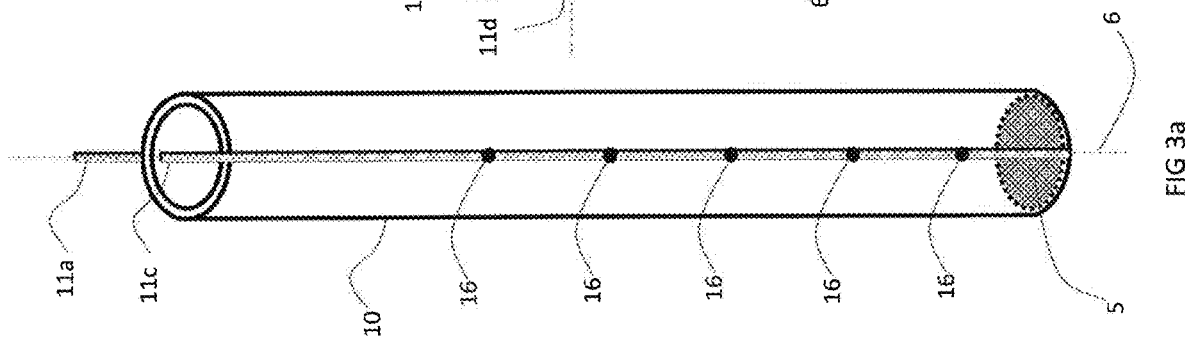

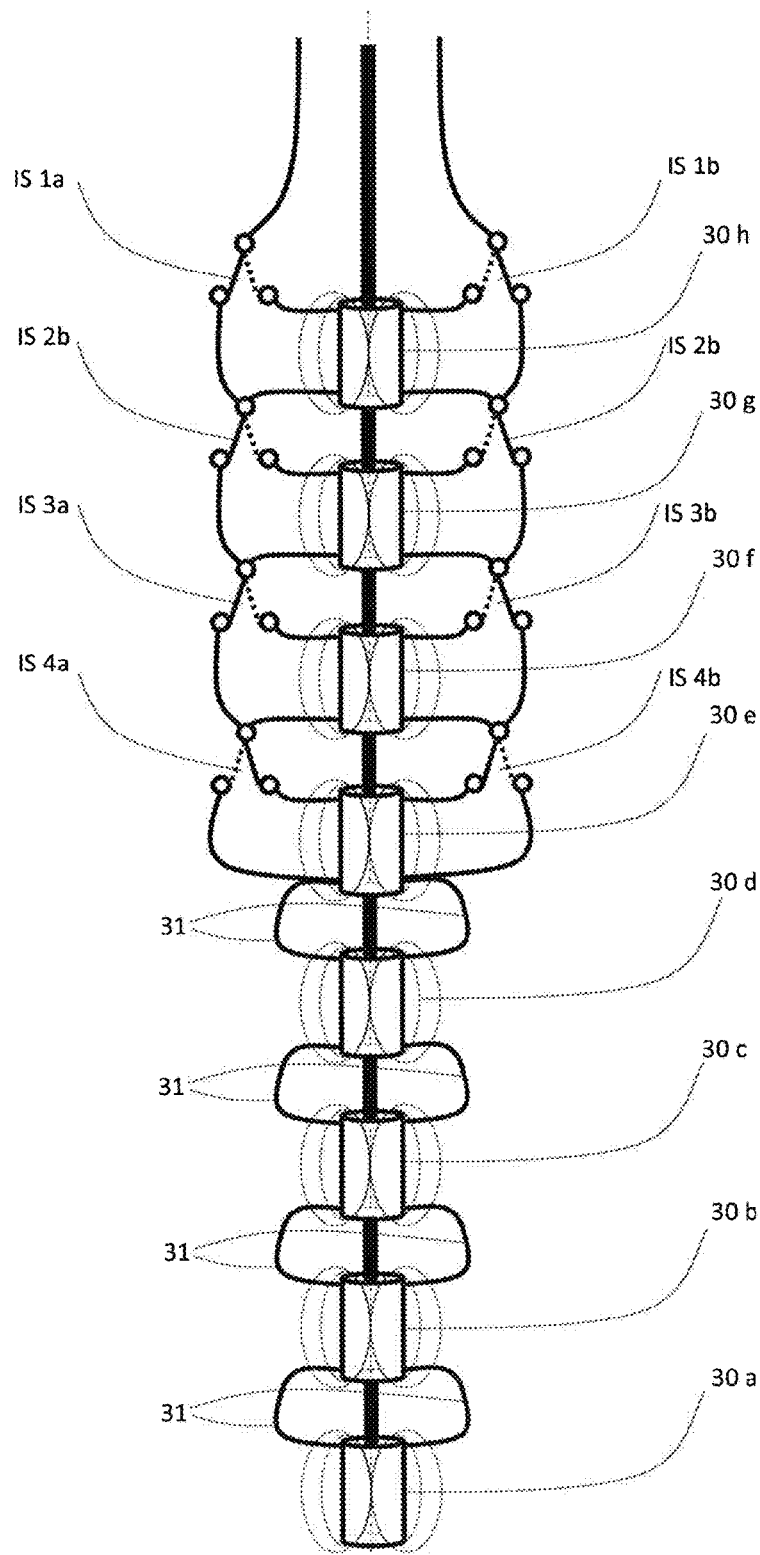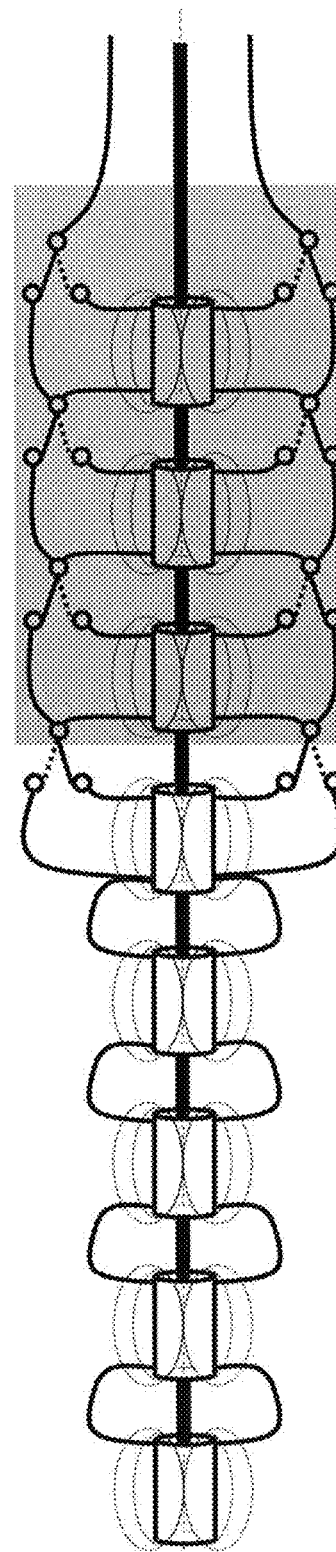
FIG 7a
FIG 7b

SENSOR ASSEMBLY FOR MEASURING THE AVERAGE VELOCITY IN CONDUITS OR OPEN CHANNELS

CROSS-REFERENCE TO RELATED APPLICATION(S)

This application is a National Stage Application of PCT/IB2021/000702, filed Oct. 12, 2021, which claims benefit of Ser. No. 20/198,856.5, filed Sep. 29, 2020, in Europe, and which applications are incorporated herein by reference. To the extent appropriate, a claim of priority is made to each of the above disclosed applications.

FIELD OF THE INVENTION

The invention relates to a method and device to measure the average velocity of a fluid flowing in closed pipes of different sizes and open channels with different water levels.

BACKGROUND OF THE INVENTION

Insertion flowmeters for measuring the flow velocity of a fluid in pipes or open channels have been used extensively. At the beginning mechanical devices having a rotating propeller were used. Those devices had the disadvantage of being point velocity devices which were inserted at the theoretical average velocity point in closed pipes. In open channels or rivers, velocity profiles are taken with the mechanical devices following the standard ISO 748, what is very time consuming. In addition, mechanical devices are very sensitive to debris.

Averaging differential pressure also called averaging Pitot Tube flowmeters have been used in closed pipes, they had the drawbacks of strong non-linearity, orifices that could clog, and poor accuracy.

Ultrasonic transit time flowmeters are used in closed pipe applications as well as in open channel applications. Wetted sensors are used for both applications and are specific for one application, i.e. one pipe diameter or one water level in open channel. Consequently they are used for stationary applications only. Clamp-on ultrasonic transit time flowmeters are used for mobile closed pipe applications, but are suffering from poor accuracy.

Electromagnetic single point insertion flowmeters are very often used. In closed pipe application, they need to be inserted at the theoretical average velocity point or at the average velocity point determined after site calibration. In open channels or rivers, extensive velocity profile measurements are thereby requested (refer to ISO 748).

Ultrasonic continuous wave (CW) or pulsed Doppler systems are used in both closed pipe applications and open channels. They are easy to use and do not require extensive profiling as they measure over the total axis of the ultrasound emission. However, they need particles in the fluid to reflect the ultrasonic beam with the Doppler signature and are suffering from poor accuracy especially at low velocities.

A major breakthrough has been disclosed in U.S. Pat. No. 4,688,432 describing an averaging insertion electromagnetic sensor measuring the mean velocity of fluid flowing in a conduit and sensing the flow velocities at a number of locations across the interior of the conduit. This type of sensor has the advantages of being very accurate and less sensitive for distorted velocity profiles but has the drawback that each sensor needs to be built for a specific conduit size and cannot be used in open channel applications.

U.S. Pat. No. 8,136,410 discloses the same type of sensor but with an axial removable coil tree allowing repair if needed. This type of sensor has the same disadvantage that each sensor needs to be built for a specific conduit size and cannot be used in open channel applications.

SUMMARY OF THE INVENTION

The present invention aims to provide an improved electromagnetic averaging insertion sensor that can be used in a range of pipe sizes as well as in open channel applications with different water levels. To this end, the sensor is equipped with a device or technology that isolates the electrodes which are not exposed to the flowing fluid that needs to be measured. The device has a tubular shape which slides over the sensor itself and is mechanically fixed for the closed pipe applications. In open channel applications the friction force from the isolating seals is sufficient to maintain it in place. The isolation technologies are avoiding the electrodes which are not immersed in the fluid flow to be measured to generate their electrical signal which is bad for the measurement and would harm the accuracy.

BRIEF DESCRIPTION OF THE DRAWINGS

FIG. 1 also represents an enlarged view of the seals at both ends of the isolation tube.

FIG. 2 also represents an enlarged view of the seals at both ends of the isolation tube.

FIG. 3a is a perspective view of the housing of the sensor assembly according to the invention with the rod electrode arrangements. FIG. 3b represents a sectional view of the housing with the rod electrode arrangements.

FIGS. 4a and 4b respectively represent another variant of the housing of FIG. 3a and FIG. 3b using button electrode arrangements instead of the rod electrode arrangements.

FIG. 7a schematically represents the isolation means allowing to deenergize a number of electromagnets in order to isolate their associated pairs of electrodes from the active ones. FIG. 7b shows more specifically the 3 electromagnets faded out (deenergized).

DESCRIPTION OF THE INVENTION

The invention relates to a magnetic flowmeter and more specifically to a sensor assembly for measuring the average velocity of a fluid flowing in a closed conduit or in an open channel. According to the invention, the assembly is adapted to measure the average velocity in closed conduits of different sizes and in open channels with varying fluid levels. In this respect, the assembly is provided with means isolating some of the electrodes or of the electrode signals depending on the conduit size or on the water level in the open channel as further explained hereafter.

Figure 1:
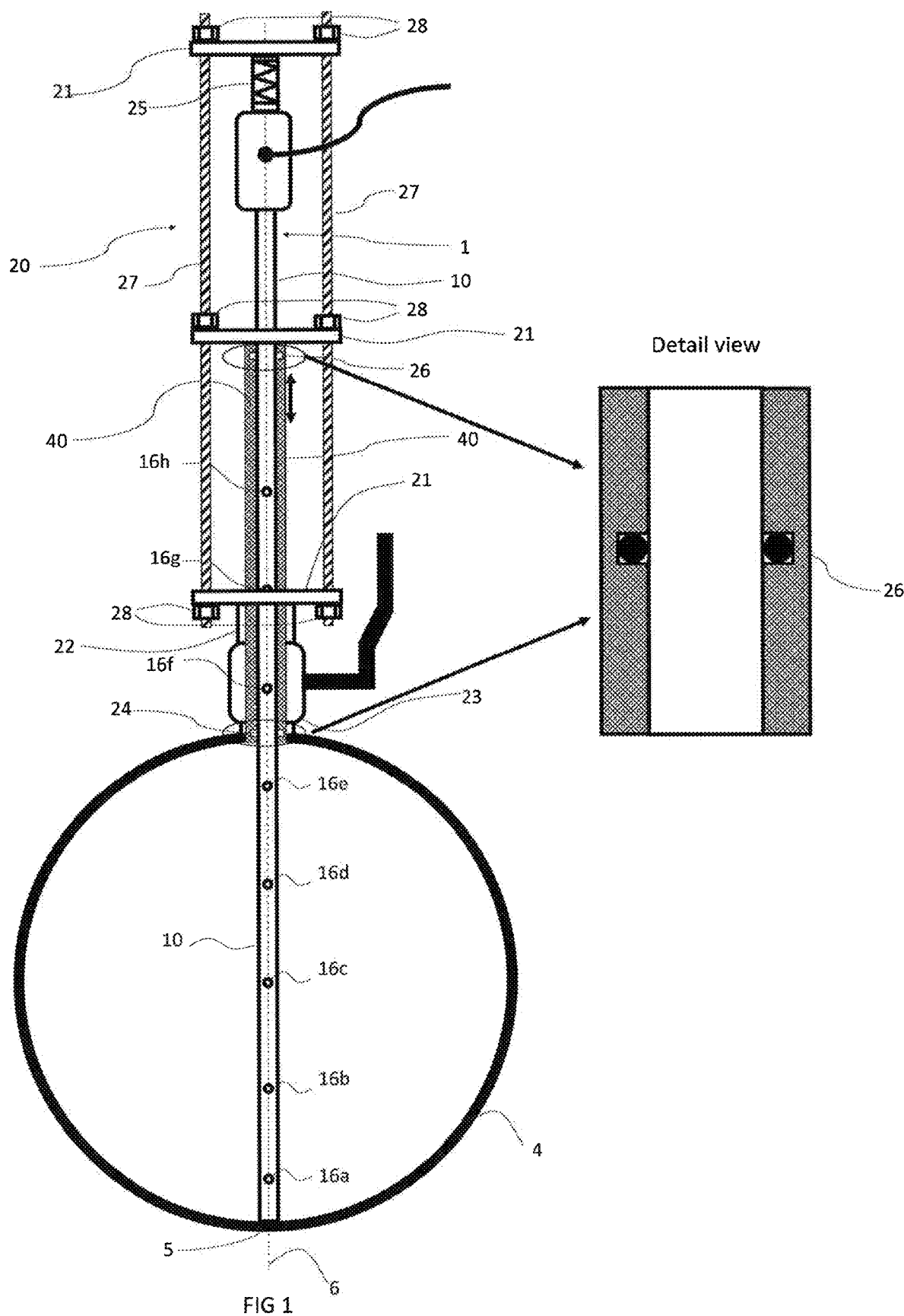
FIG. 1 is a cross-section view of a sensor assembly according to a variant of the invention mounted in a closed conduit. In this variant, the sensor has 5 electrode pairs which need to be exposed to the fluid flow and 3 electrode pairs which need to be isolated.

FIG. 1 represents the sensor assembly 1 according to the invention used for measuring the average velocity of a fluid flow in a closed conduit 4 which can be cylindrical or have a different shape. The assembly 1 comprises a hollow housing 10, also called hollow body or body, which is made-out of a mechanically resistant material such as a metal or more precisely a stainless steel or any other suitable material such as plastic, fibre reinforced synthetic plastic, ceramic, etc. Preferably, the housing has a cylindrical tubular shape but any other suitable shapes like oval or other streamlined shapes are possible. The housing is closed at the far end 5 intended to rest on the conduit wall after passing through an opening cut or drilled in the conduit wall of the pipe 4. A valve 23 together with a seal device 22 allows the sensor body to be easily removed for maintenance, calibration or repair without shutting down the flow process.

According to the variant of the FIGS. 3a and 3b, the body 10 has a plurality of slots 12 that extend along the external wall of the body parallel to the longitudinal axis 6. It should be appreciated that the body may have two or a plurality of slots 12 (12a,12b,12c,12d in the example) on the perimeter of the body 10 having a length that is equal or shorter than the body 10. The slots usually have the same length as the body but can have different lengths. Preferably, the slots are blind holes that do not extend into the interior of the hollow housing. Those slots 12 are designed to receive strips or rods 11 (11a,11b,11c,11d in the example) formed of a conductive material, said rods can have any shape: cylindrical rectangular, square or other. A layer of insulation 13 covers the rods 11 and the body 10 except for selected portions 16 of the rods forming the electrodes intended to be exposed to the fluid flow. The exposed portions of the rods can be equally spaced or not. The number of electrodes on each rod may vary from one to any suitable number depending of the range of pipe size to be covered and depending on the resolution of the velocity profile which is desired. The electrodes 16 on the different rods are disposed facing each other with two electrodes facing each other forming a pair.

In FIG. 3a, the body 10 has two slots respectively receiving a rod 11a and a rod 11c with are spaced diametrically opposed or in other words at 180°. On each rod, five electrodes 16 are exposed to the fluid flow. In FIG. 3b, the body 10 has four slots 12a, 12b, 12c. 12c respectively receiving four rods 11a, 11b, 11c, 11d spaced equally at 90°. Those slots 12 and rods 11 may be spaced equally or at any angle between 15° and 90°, the electrodes exposed to the fluid flow are not shown in FIG. 3b.

In FIG. 4a and FIG. 4b, a variant using button electrodes 14 instead of rods 11 is shown. Those button electrodes 14 are disposed in openings 9 passing through the wall of the body 10 to extend into the interior of the sensor body 10. Several openings 9 are aligned along the longitudinal axis 6 of the body 10 to receive the respective button electrodes 14. In a similar way as for the electrode rod arrangement, there are at least two button electrodes facing each other to form a pair of electrodes. The button electrodes can be individually electrically connected with individual wires 15 to signal amplifiers.

The housing 10 is hermetically closed at one end using a cap 5 which is welded, glued, hermetically threaded, or using any other technique suited to the material of the body 10.

Figure 5A:
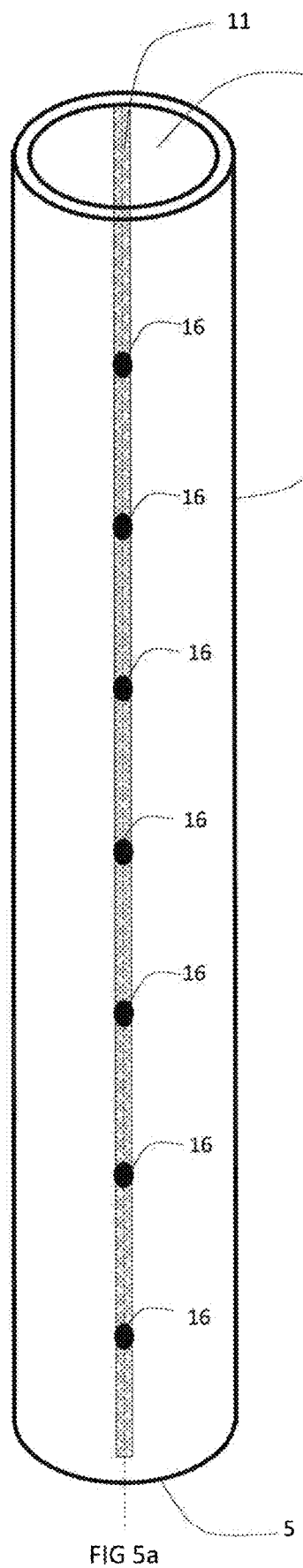
FIGS. 5a, 5b and 5c respectively represent perspective views of the housing with the rod electrode arrangements, the electromagnet or electromagnets assembly to be disposed inside the housing.
Figure 5B:
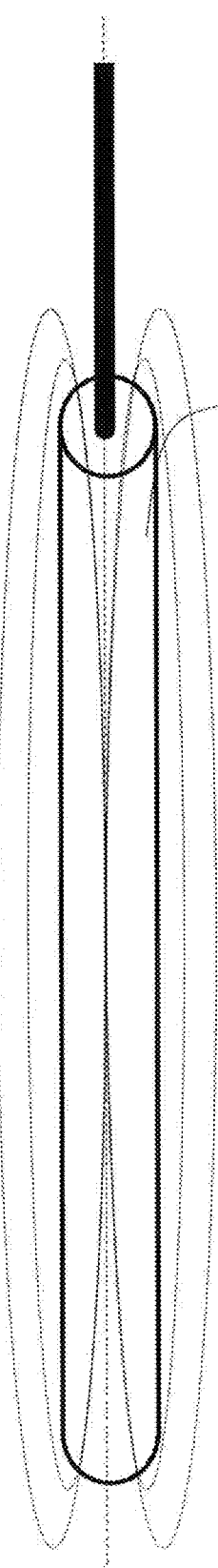
Figure 5C:
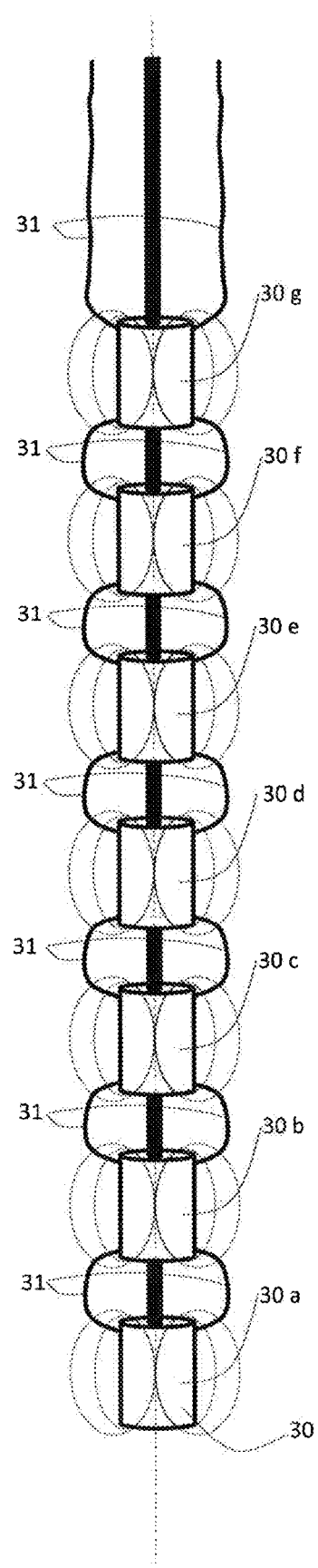

The pairs of electrodes are associated with a magnet, preferably an electromagnet 30 as shown in FIG. 5b (wires not shown) or a plurality of electromagnets 30 (30a to 30g in the example) with the connecting wires 31 between the electromagnets 30 as shown in FIG. 5c. The electromagnet(s) are arranged within the hollow part of the body 10 and axially inserted through the opening 7 from the body 10 opposed to the cap 5 (FIG. 5a). In use, the electromagnetic field generated in the fluid by the internal (electro)magnet has an axis which extends normal to the direction of fluid flow. As the fluid flows through the electromagnetic field, each electrode produces an electrical signal as a function of the velocity of the fluid flow adjacent thereto. Thus, a plurality of discrete fluid flow velocity signals are generated simultaneously at a plurality of locations across the area of the conduit or channel.

After the electromagnet(s) 30 are in place inside the body 10, they are permanently fixed and maintained in place avoiding any movement or vibration, even minor, to reduce signal noise and avoid calibration drifts. This can be achieved by encapsulating the electromagnet(s) 30 in a self-curing or cold curing or autopolymerising resin were a base, a catalyst and an activator in liquid form are mixed to a homogenous consistency, and remain liquid sufficient time to be pored inside the body 10 over and surrounding the electromagnet(s) 30. After the curing process is terminated, the electromagnet(s) 30 are permanently fixed in their place.

To measure with a same sensor the fluid flow in conduits of varying sizes and in open channels with varying fluid levels, it is mandatory to isolate the electrodes which are not exposed to the fluid flow to be measured in order to avoid false flow readings in addition to noisy signals.

Figure 2:
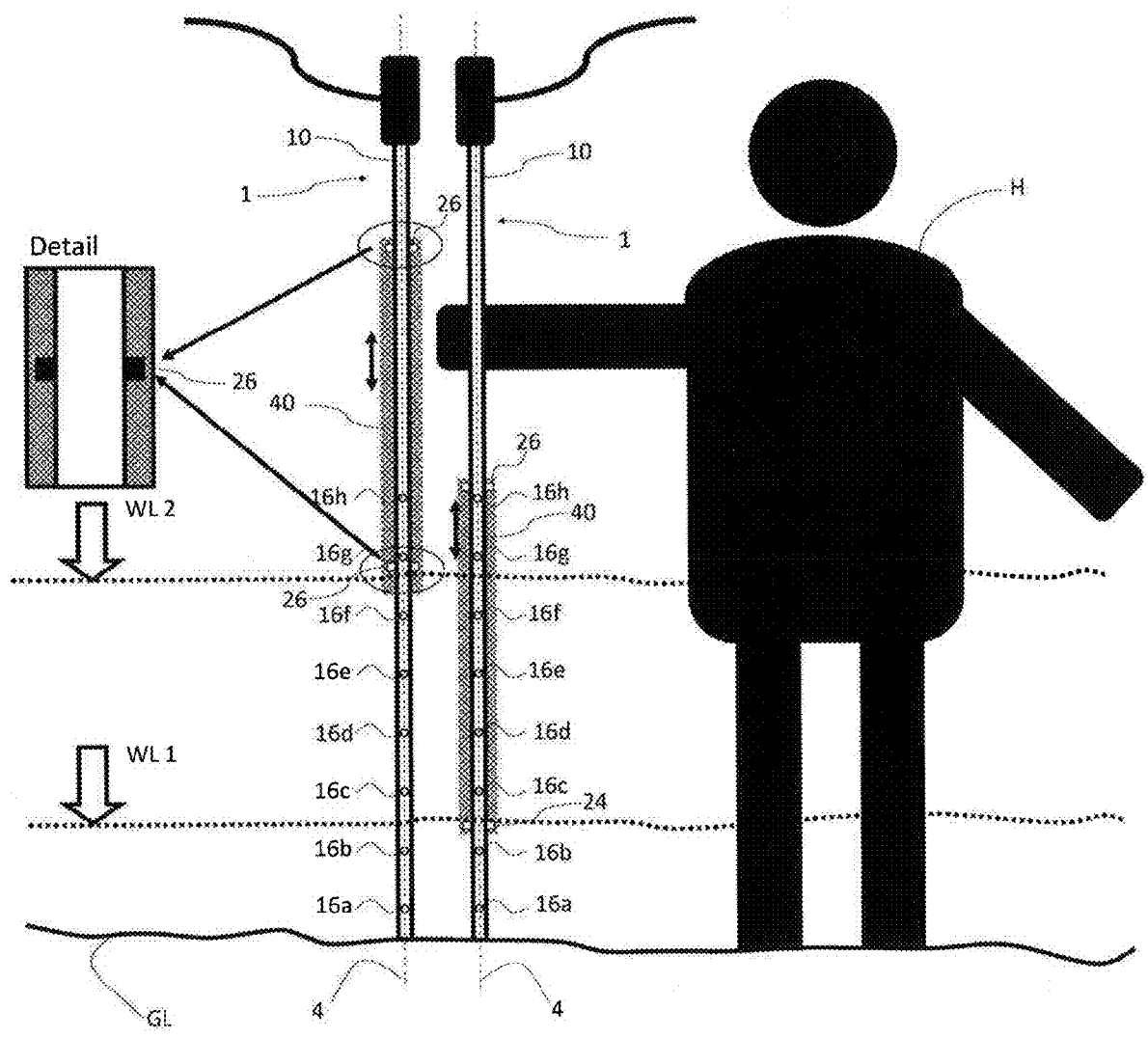
FIG. 2 schematically represents a hydrologist wading through a river bed with a sensor assembly according to another variant of the invention. In this illustration, there are two examples of water levels (WL1 and WL2) requiring two different configurations of the sensor assembly according to the invention. For WL1, 2 pairs of electrodes need to be exposed to the water flow and 6 pairs of electrodes need to be isolated. For WL2 6 pairs of electrodes need to be exposed to the water flow and 2 pairs of electrodes need to be isolated.

As shown in FIG. 1 and FIG. 2, the electrodes positioned outside the fluid flow to be measured, i.e. the electrodes 16f-h in FIG. 1, the electrodes 16g-h in FIG. 2 for WL2 and the electrodes 16c-h for WL1, need to be isolated so that only measurements with the electrodes exposed to the fluid flow are performed. To this end, the sensor assembly according to the invention comprises isolation means. According to a variant, the isolation means comprise an isolation tube 40 sliding along the housing 10. Other means could be a heat-shrinkable tube or an isolation tape (not represented). The isolation tape is a waterproof tape for example from the brands 3M™ or Tesa®. The heat-shrinkable tube is also for example from the brand 3M™.

The isolation means are more particularly described hereafter for the rod electrode arrangement but they could apply in a similar way for the button electrode arrangement.

In FIG. 1, for a closed conduit application, the sliding isolation tube 40 is part of an insertion and mounting assembly 20. The sensor assembly 1 is inserted into the conduit 4 through a compression seal 22 and usually a valve 23. As the internal process pressure is usually much higher than the pressure outside of the conduit, the sensor assembly 1 needs to be maintained in place using the insertion and mounting assembly 20. The mounting assembly 20 includes a spring housing with the spring 25, three mounting plates 21 attached respectively to the spring housing at one end, to the compression seal 22 at the other end and to the isolation tube 40 in the middle. At least one, but preferably two threaded rods 27 with nuts 28 maintain the sensor assembly 1 in place using the constant axial force from the spring 25 on the sensor assembly 1. The isolation tube 10 is maintained in place by the middle mounting plate 21 and the nuts 28.

Figure 6B:
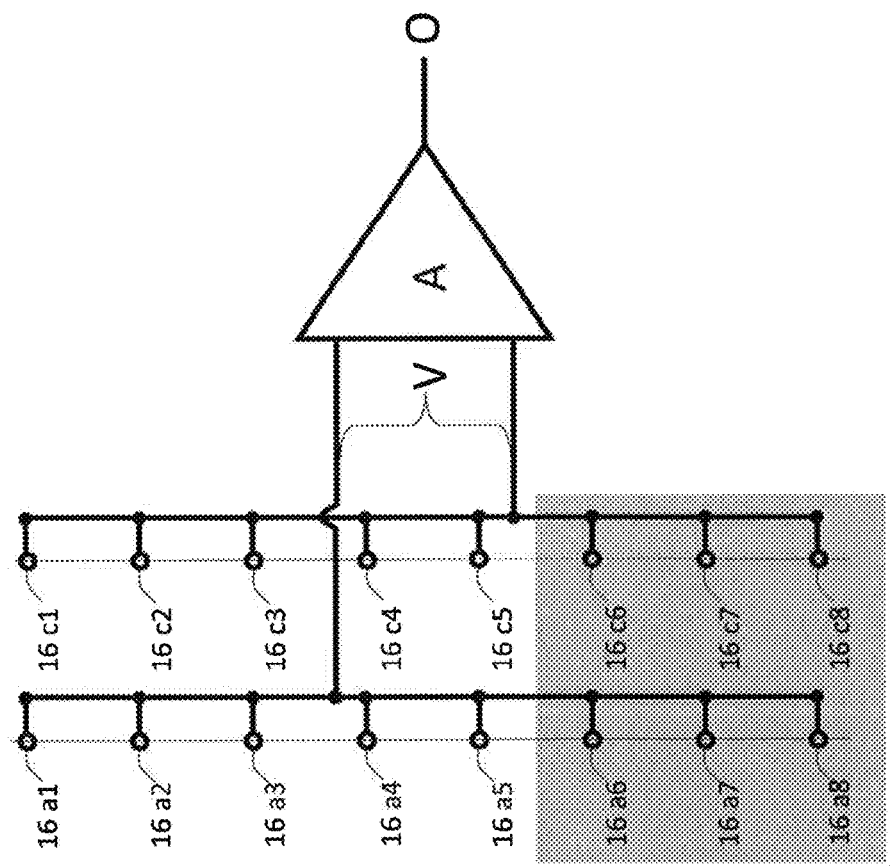
FIG. 6b illustrates the effect of an isolation tube on the electrical signals issued from the electrodes.
Figure 6A:
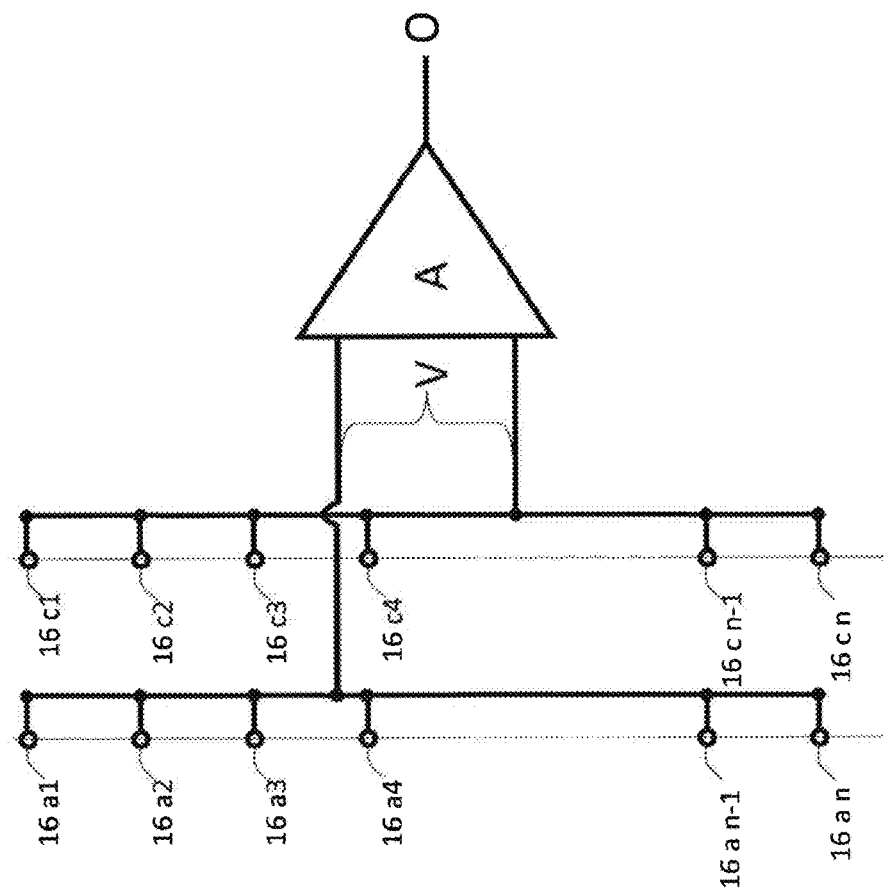
FIG. 6a schematically represents the electrical connection of the electrodes from a sensor assembly according to the invention with a rod electrode arrangement.

In FIG. 2, for an open channel application, no insertion and mounting assembly is required. Depending on the water level, the isolation tube is slid along the housing with the electrodes. As no differential pressure is present in the open channel between the water surface and the air, the friction force between the seals 26 from the isolation tube 40 and the housing 10 is sufficient to maintain it in place during the measurements. As shown, a hydrologist H wading through an open channel or river performs a cross sectional velocity profile. As the hydrologist is wading, the maximum water level should not exceed +/−1.2 m or +/−4 ft. Two different water levels are depicted in FIG. 2. A low water level WL 1 where two electrodes 16a and 16b have to be exposed and six electrodes 16c-h have to be isolated. A second high water level WL 2 where six electrodes 16a-f have to be exposed and two electrodes 16g-h have to be isolated. This is easily done by the hydrologist H by moving up and down the isolation tube 40 along the housing so that the lower part of the isolation tube is slightly under the water surface WL. In terms of electrode signals, the discrete fluid flow signal is generated by each electrode pair 16. As represented in FIG. 6a, one electrode 16a of each pair has its output connected in series with the other electrode 16a from the same rod and same side of the body 10 to add their electrical signals. The combination of the electrical signals from one side of the body 10 is delivered to one input of the amplifier A. The other electrodes of each pair 16c from the opposite side of the body 10 also have their outputs connected in series to add their electrical signals. The combination of the electrical signals 16c is delivered to the second input of the amplifier A. The amplifier combines the voltages of all discrete electrical signals generated by all individual electrodes to provide an output signal O corresponding to the average flow velocity of all electrodes exposed to the fluid flow. Instead of using electrode pairs 16a and 16c, any combination of electrode pairs among 16a, 16b, 16c, 16d (in reference to the four rods 11a-11d of FIG. 3b) could be used. When three pairs of electrodes are isolated from their environment with the sliding tube as in FIG. 1, the electrical signals from electrode pairs 6, 7, and 8 are reduced to zero (see FIG. 6b) and the voltage delivered to the amplifier A is thus only the average voltage from the individual electrode pairs 1, 2, 3, 4, and 5 representing the average flow velocity from the fluid flow flowing through the pipe.

Other isolation means may consist in acting directly on the electrical signals instead of isolating the electrodes not exposed to the fluid flow. The isolation means to avoid electrical signals from undesired pairs of electrodes in the rod electrode arrangement is shown in FIG. 7a for their associated electromagnets 30. In this variant, the coils or electromagnets associated to the electrode pairs which are not desired will be switched off. In this example, there are eight electrode pairs and consequently eight electromagnets. In this particular example, the lower or minimum pipe size range is covered by four electrode pairs associated to the first four electromagnets 30a, 30b, 30c and 30d. Those electrode pairs are always active, and their associated electromagnets always energized, therefore those electromagnets are hard wired with wires 31. The four other electrode pairs and their associated electromagnets are activated as necessary. In this example, the maximum pipe size range will be covered by eight electrode pairs (4 additional) associated to the electromagnets 30e, 30f, 30g, and 30f. Adding the electromagnets as required is made by closing inverter switches allowing the current to flow through the electromagnet. For the example as shown in FIG. 1, five pairs of electrodes are requested to be active. Electromagnet 30e need to be energized which is achieved by closing the inverter switches IS 4a and IS 4b, all other inverter switches remain open.

Figure 8:
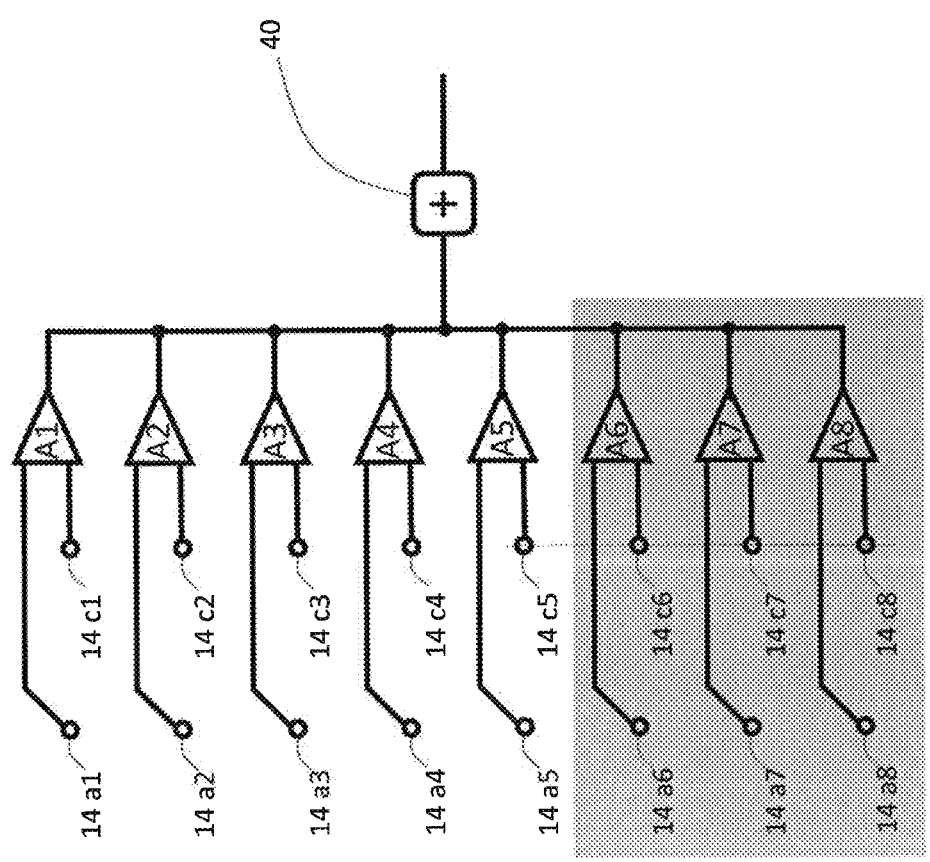
FIG. 8 schematically represents isolation means used with the button electrode arrangement, when each electrode is individually wired to each associated amplifier; with 3 electrode pairs faded out (eliminated) in this example.

When a button electrode arrangement is used such as shown in FIG. 4a and FIG. 4b, if each button electrode is individually wired to an electrical amplification system as represented in FIG. 8 the unwanted electrode signals can be switched off by applying a zero amplification to the amplifier A6, A7 and A8 before the signals are directed to the adder 40. In that way, only the desired electrode pairs are activated.

A simplified way to measure fluid flow in a range of pipe size is to use the number of electrodes and associated electromagnets to cover the minimum pipe size. This number can vary: 3, 4, 5 electrodes and associated electromagnets or any other number of electrodes and associated electromagnets. When used in a pipe of larger size the sensor is for example located in the centre part of the pipe or conduit. The sensor can by mechanically secured in this location by screwing a metallic (or any other suitable material) body under the active sensor, having the correct length to correctly position the sensor and allowing the sensor to be maintained by spring load 25. Positioning the sensor in the centre of the conduit is one solution, any other suitable position can be chosen. The active sensors will average the point velocities and automatically correct the output value when the fluid flow is changing from laminar to turbulent and vice versa. Specific calibration for each pipe size the sensor is going to be used in, will increase the accuracy but is not mandatory.

The invention claimed is:

1. A sensor assembly for measuring average velocity of a fluid flowing in a closed conduit or in an open channel, said sensor assembly being adapted for measuring the average velocity through closed conduits of different sizes or through open channels with different fluid levels, the sensor assembly comprising:

a housing configured to extend across an inside of the closed conduit or to extend vertically in a section of the open channel, said housing comprising pairs of electrodes and at least one associated electromagnet for measuring velocity distribution in the closed conduit or in the open channel;

isolation means for providing isolation from the pairs of electrodes or from the signals of the pairs of electrodes that are free from contact with fluid flow to be measured;

said isolation means being configured to be adapted depending on water level in the open channel or on size of the closed conduit.

2. The sensor assembly according to claim 1, wherein the isolation means comprise a tube sliding along the housing and allowing the isolation from the pairs of electrodes that are free from contact with the fluid flow to be measured.

3. The sensor assembly according to claim 1, wherein the isolation means comprise a heat-shrinkable tube or an isolation tape allowing the isolation from the pairs of electrodes that are free from contact with the fluid flow to be measured.

4. The sensor assembly according to claim 1, wherein each pair of electrodes is associated to an electromagnet, the isolation means are formed of the electromagnet configured to be individually switched off using switches to isolate the signal from the associated pair of electrodes.

5. The sensor assembly according to claim 1, wherein the pairs of electrodes are pairs of button electrodes, the isolation means being formed of amplifiers individually wired to the button electrodes, the amplifiers being configured to be individually set to zero to isolate the signal from the associated pair of electrodes.

6. The sensor assembly according to claim 5, wherein the housing has a wall with a plurality of openings receiving the button electrodes, said opening extending through the wall until an interior of the housing and being aligned along a longitudinal axis to form a row of openings, the housing comprising at least two rows of openings with the openings facing each other on each row forming a pair of electrodes.

7. The sensor assembly according to claim 1, wherein the housing has a wall with a plurality of slots extending each along an longitudinal axis of the housing, said slots being configured to receive rods made of a conductive material, a layer of insulation covering the rods and the housing except for selected portions of the rods forming the electrodes to be exposed to the fluid flow, the electrodes on the rods facing each other, with two electrodes facing each other forming a pair of electrodes.

8. The sensor assembly according to claim 1, wherein, for a closed conduit, the tube is part of an insertion and mounting assembly, said insertion and mounting assembly comprising a spring housing, three mounting plates attached respectively to the spring housing at one end, to a compression seal at an other end, and to the tube in the middle, and comprising at least one threaded rod with nuts maintaining the sensor assembly in place using constant axial force from a spring of the spring housing on the sensor assembly.

9. A method for measuring average velocity of a fluid flowing in a closed conduit or in an open channel using a sensor assembly, the sensor comprising:
a housing extending across an inside of the closed conduit or extending vertically in a section of the open channel, said housing comprising pairs of electrodes and at least one associated electromagnet for measuring velocity distribution in the closed conduit or in the open channel; and
isolation means adapted according to fluid level in the open channel or size of the closed conduit;
the method comprising a step of moving the isolation means along the housing to isolate the pairs of electrodes that are free from contact with the fluid, or a step of isolating the signal from the pairs of electrodes that are free from contact with the fluid.

10. The Method according to claim 9, wherein each pair of electrodes is associated to an electromagnet, the step of isolating the signal from the pairs of electrodes that are free from contact with the fluid comprising reducing to zero voltage of said pairs of electrodes.

11. The Method according to claim 9, wherein each pair of electrodes is associated to an electromagnet, the step of isolating the signal from the pairs of electrodes that are free from contact with the fluid comprising switching off the electromagnets associated to said pairs of electrodes.

12. The Method according to claim 9, wherein the electrodes are button electrodes with each button electrode individually wired to an amplifier, the step of isolating the signal from the pairs of electrodes that are free from contact with the fluid comprising a zero amplification to the amplifier of said pairs of electrodes.

13. A sensor assembly adapted for measuring an average velocity of a fluid flowing through closed conduits of different sizes with minimum diameters, the sensor assembly comprising:
pairs of electrodes and at least one associated electromagnet defining active sensors for measuring velocity distribution in a closed conduit to be measured, wherein a plurality of the pairs of electrodes are arranged according to a minimum pipe diameter of the closed conduit to be measured; and
wherein for a closed conduit having a diameter larger than the minimum diameter, the sensor assembly further comprises:
a body positioned under the active sensors for mechanically securing the sensor assembly, said body having a length adapted to position the active sensors in the closed conduit having a diameter larger than the minimum diameter.

14. The sensor assembly according to claim 13, wherein the body has a length adapted for positioning the active sensors in a center part or any other suitable part of the closed conduit to be measured.

15. The sensor assembly according to claim 14, wherein the body is screwed under the active sensors.

16. The sensor assembly according to claim 13, wherein the body is screwed under the active sensors.

17. The sensor assembly according to claim 13, wherein the active sensors of the sensor assembly are configured to average point velocities and automatically correct an output value when fluid flow is changing from laminar to turbulent and from turbulent to laminar.

18. The sensor assembly according to claim 14, wherein the active sensors of the sensor assembly are configured to average point velocities and automatically correct an output value when fluid flow is changing from laminar to turbulent and from turbulent to laminar.

19. The sensor assembly according to claim 15, wherein the active sensors of the sensor assembly are configured to average point velocities and automatically correct an output value when fluid flow is changing from laminar to turbulent and from turbulent to laminar.

20. The sensor assembly according to claim 16, wherein the active sensors of the sensor assembly are configured to average point velocities and automatically correct an output value when fluid flow is changing from laminar to turbulent and from turbulent to laminar.

* * * * *